United States Patent
Cartwright et al.

[11] Patent Number: 6,007,051
[45] Date of Patent: Dec. 28, 1999

[54] WIRE DUCT WIRING TOOL

[75] Inventors: Christopher B. Cartwright, Lafayette; Christopher G. Post, Dayton, both of Ind.

[73] Assignee: Caterpillar Inc., Peoria, Ill.

[21] Appl. No.: 09/190,085

[22] Filed: Nov. 12, 1998

[51] Int. Cl.⁶ .................................................. H02G 2/08
[52] U.S. Cl. ...................... 254/134.3 R; 254/134.3 FT
[58] Field of Search ................... 254/134.3 FT, 254/134.3 R, 134.4

[56] References Cited

U.S. PATENT DOCUMENTS

| | | | |
|---|---|---|---|
| 2,946,560 | 7/1960 | Ferm | 254/134.3 FT |
| 4,520,766 | 6/1985 | Akeroyd. | |
| 4,677,734 | 7/1987 | Bloch et al.. | |
| 4,715,100 | 12/1987 | Cross. | |
| 4,793,206 | 12/1988 | Suzuki. | |
| 4,951,923 | 8/1990 | Couture | 254/134.3 R |
| 5,236,177 | 8/1993 | Tamm | 254/134.3 FT |
| 5,265,326 | 11/1993 | Scribner. | |
| 5,473,816 | 12/1995 | Harden, Jr. et al.. | |
| 5,638,477 | 6/1997 | Patterson et al.. | |
| 5,639,183 | 6/1997 | Griffioen et al.. | |
| 5,695,358 | 12/1997 | Myer et al.. | |
| 5,700,156 | 12/1997 | Bussard et al.. | |
| 5,709,025 | 1/1998 | Wuyts. | |
| 5,884,901 | 3/1999 | Schilling | 254/134.3 R |

FOREIGN PATENT DOCUMENTS

| | | | |
|---|---|---|---|
| 0619991 | 8/1978 | U.S.S.R. | 254/134.3 |

*Primary Examiner*—Eileen P. Morgan
*Assistant Examiner*—Daniel Shanley
*Attorney, Agent, or Firm*—Fred Baehr

[57] ABSTRACT

A wiring tool for wire ducts disposed at a 90° angle and having a plurality of teeth forming the side walls, the wiring tool comprising a pair of flat bars joined to form a 90° angle with a riser portion extending upwardly from the juncture of the bars and elastomer strap fastened to the distal ends of the bars to hold the wiring tool at the juncture of wiring ducts to facilitate placing a bundle of wires in the ducts and bending the bundle 90° in the ducts without damaging or removing teeth adjacent the juncture of the ducts.

10 Claims, 3 Drawing Sheets

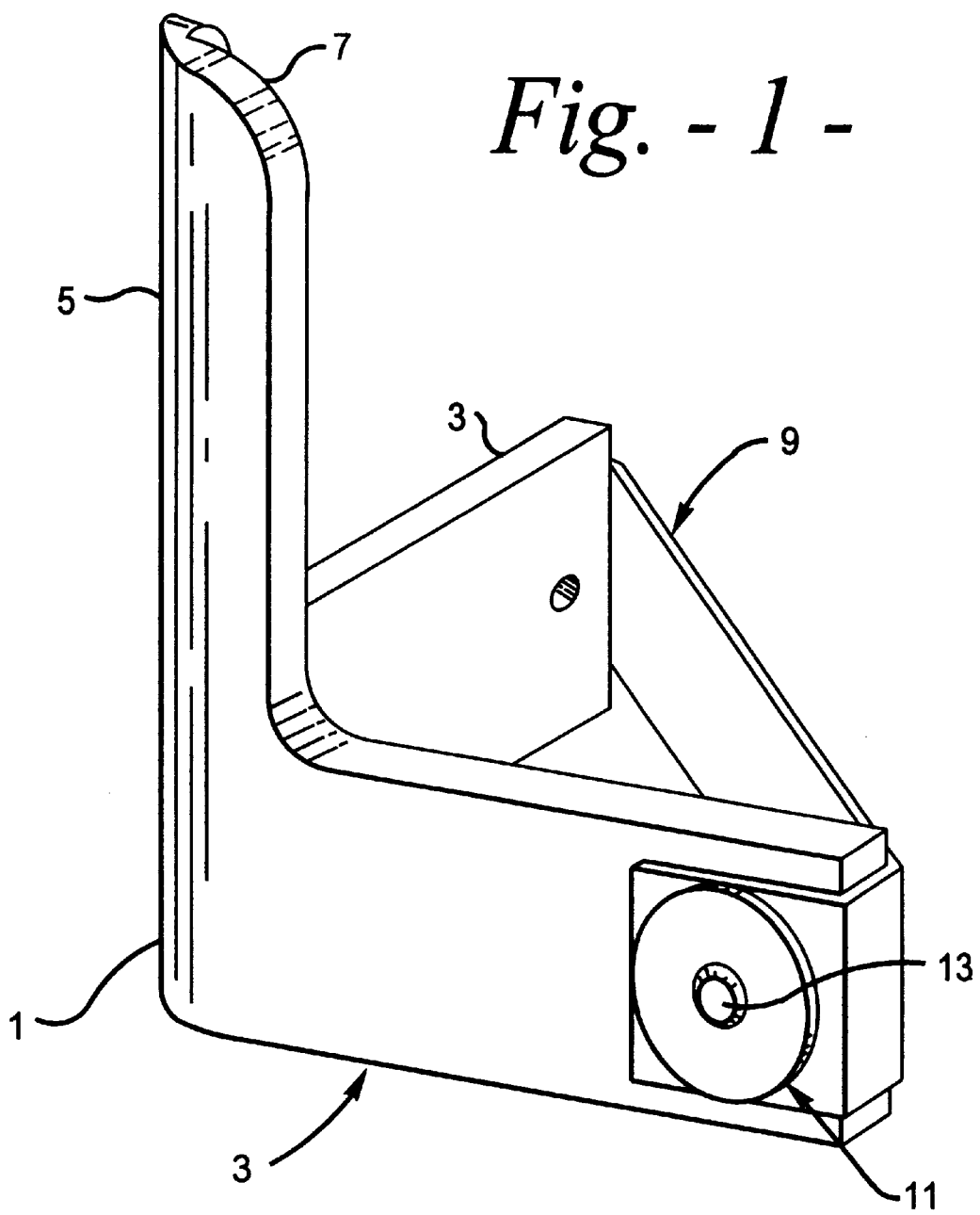
Fig. - 1 -

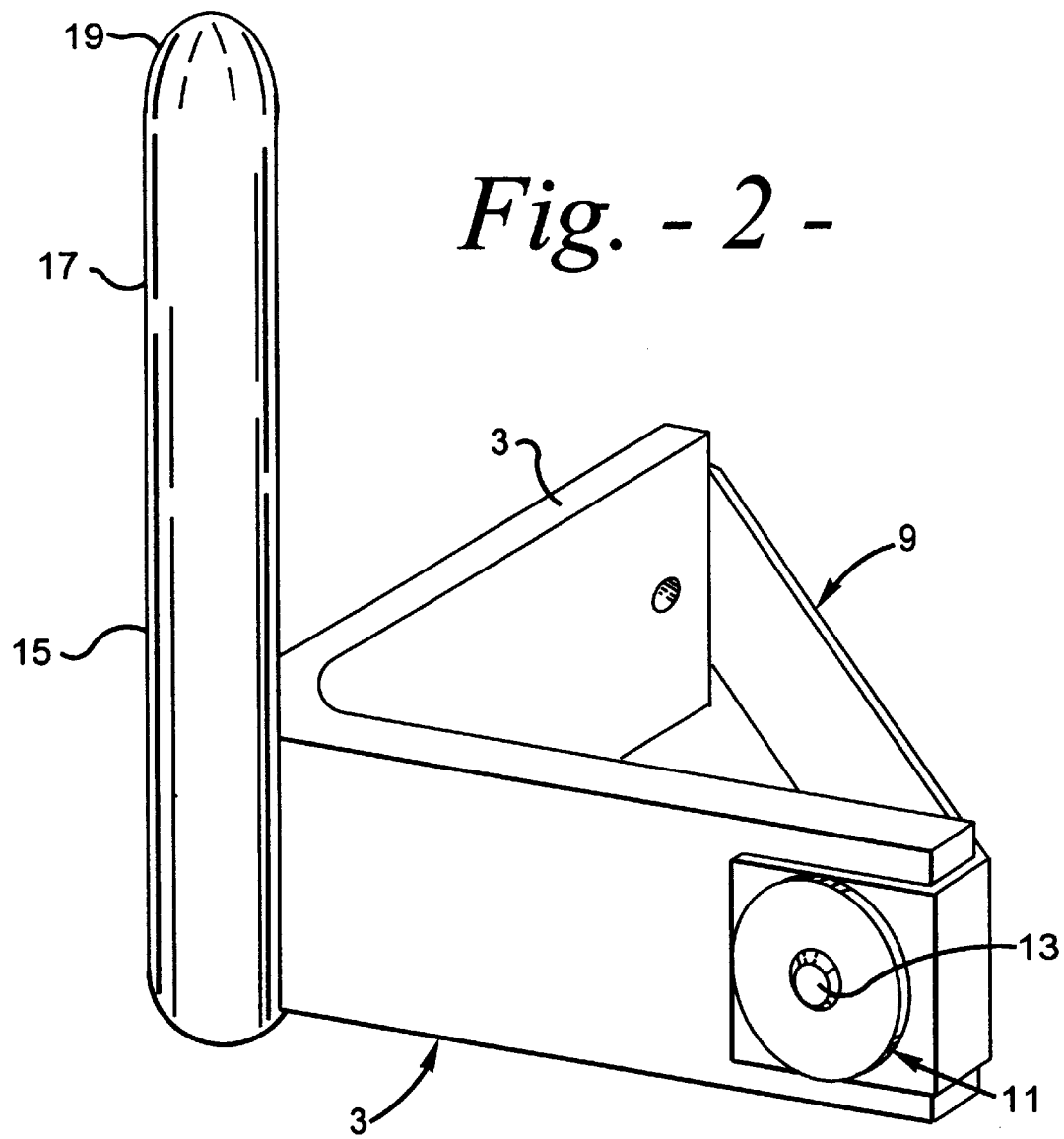
Fig. - 2 -

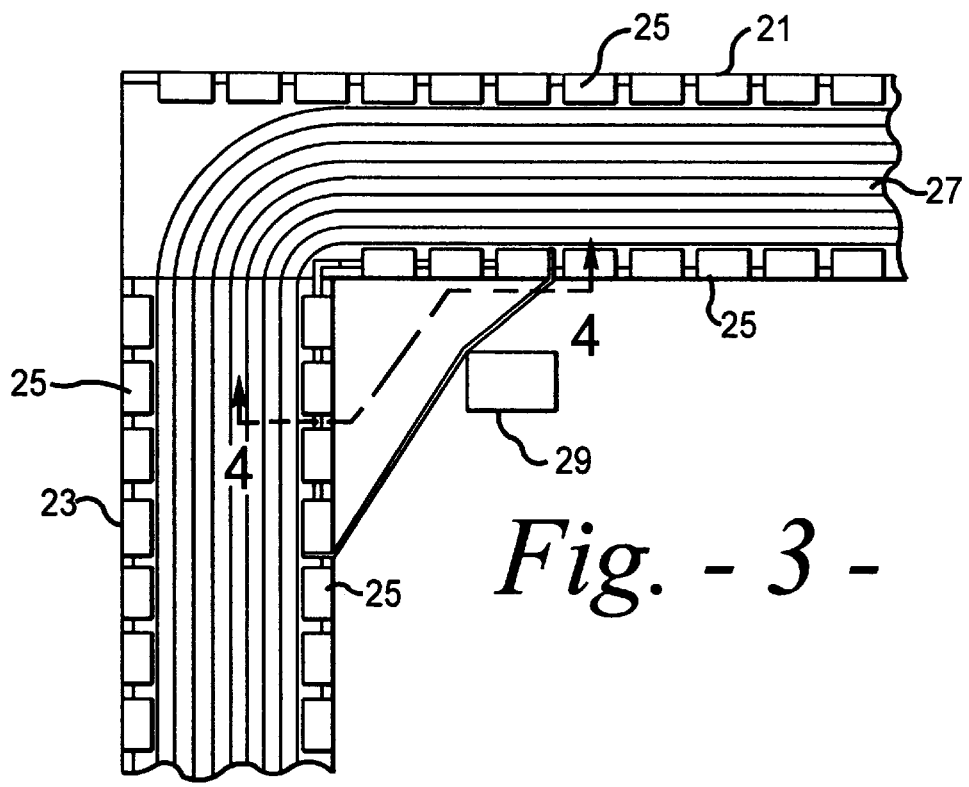
Fig. - 3 -
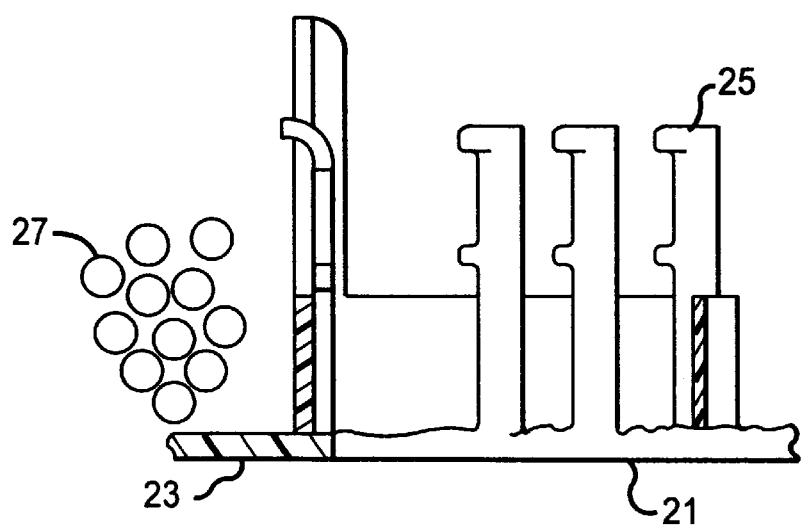
Fig. - 4 -

WIRE DUCT WIRING TOOL

TECHNICAL FIELD

The invention relates to a tool and more particularly to a wiring tool, which is placed at the juncture of wire ducts forming a right angle to facilitate running bundles of wires through the ducts without damaging the ducts adjacent the juncture.

BACKGROUND ART

With the use of wire ducts in control panel construction, there has been an ongoing problem with wire bundle strain on the wire ducts. More specifically when two sections of wire duct meet and form a 90° union. The wire ducts have sides with a plurality of spaced apart teeth, which hold the wires that enter and exit the wire duct in place. Teeth adjacent the juncture of the wire ducts had to be removed or they became bent when the stiff wire bundles were placed in the wire ducts and bent 90°. U.S. Pat. No. 4,677,734 describes the fabrication of a wire harness or bundle.

DISCLOSURE OF THE INVENTION

Among the objects of this invention may be noted the provision of preventing damage or removal of teeth adjacent the juncture of two wire ducts disposed at right angles when a bundle of wires is placed in the duct and bent adjacent the juncture.

In general, a wiring tool for wire ducts disposed at an angle to one another and have a plurality of teeth on opposite sides. The teeth form the sides of the ducts and allow wires to be brought into and out of the ducts on either side and to be held between the teeth as they enter and exit the ducts. When made in accordance with this invention the wiring tool comprises a pair of bars joined together at one end to form an angle between the bars generally equal to the angle at which the wire ducts are disposed. A riser extending upwardly from the juncture of the bars. And the wiring tool has means for holding the wiring tool in place in the wire ducts with the riser adjacent the juncture of the ducts. This facilitates placing a bundle of wires in the ducts and prevents the teeth adjacent the juncture of the ducts from being damaged. The wiring tool is easily removed from the ducts when the bundle of wires is in place in the ducts.

BRIEF DESCRIPTION OF THE DRAWING

The invention as set forth in the claims will become more apparent by reading the following detailed description in conjunction with the accompanying drawings, wherein like reference numerals refer to like parts throughout the drawings and in which:

FIG. 1 is an isometric view of a wiring tool made in accordance with this invention;

FIG. 2 is an isometric view of an alternative wiring tool;

FIG. 3 is a plan view of a pair of wiring ducts disposed at right angles with the wiring tool disposed therein; and FIG. 4 is a sectional view taken on line IV—IV of FIG. 3.

BEST MODE FOR CARRYING OUT THE INVENTION

Referring now to the drawings in detail and in particular to FIG. 1, there is shown a wiring tool 1 comprising a pair of flat bars 3 joined together at one end to form an angle of 90°. A riser portion 5 extends upwardly from the juncture of the flat bars 3. The riser portion 5 is L shaped with legs of equal length, the distal end 7 of the riser 5 is rounded off. An elastomer strap 9 is fastened to the distal ends of the flat bars 3 utilizing a flat washer 11 having an outer diameter generally equal to the width of the elastomer strap 9 and a rivet 13. The flat bars 3 and riser 5 are preferably made of one piece of transparent plastic, Lexan. The flat bars 3 are joined to form a 90° angle to fit within two sections of duct joined at 90°. It is understood that the flat bars 3 could be joined to form any angle corresponding to the angle formed by the wire ducts.

Referring now to FIG. 2 there is shown an alternative wiring tool 15, comprising a pair of flat bars 3 joined together at one end to form an angle of 90°. A riser portion 17 in the shape of a round bar extends upwardly from the juncture of the flat bars 3. The distal end 19 of the riser portion 17 is rounded off. An elastomer strap 9 is fastened to the distal ends of the flat bars 3 utilizing a flat washer 11 having an outer diameter generally equal to the width of the elastomer strap 9 and a rivet 13. The flat bars 3 and riser 19 are preferably made of one piece of transparent plastic, Lexan.

Referring now to FIG. 3 there is shown two wire ducts 21 and 23 disposed at a 90° angle with respect to each other. The wire ducts 21 and 23 have a plurality of spaced apart teeth 25 disposed on opposite sides of the ducts 21 and 23 forming side walls. The teeth 25 allow wires to enter and exit the ducts 21 and 23 along their entire length and be held in place by the teeth 25. The wiring tool 1 is disposed in the wire ducts 21 and 23 with the riser 5 or 17 extending upwardly beyond the teeth 25 at the juncture of the ducts 21 and 23. The elastomer strap 9 fits between the teeth 9 to hold the wiring tool 1 or 15 in place with the riser 5 or 17 adjacent the juncture of the wire ducts 21 and 23. The wiring tool 1 or 15 strengthens the corner of the wire ducts 21 and 23 and facilitates installing the wires 27, which may include bundles of wires or preformed wire harnesses that are relatively stiff and must be bent 90°. Without the wiring tools 1 and 15 when the wires bundles or harnesses 27 are installed the teeth 25 adjacent the juncture of the wire ducts 21 and 23 are damaged or are removed due to the stiffness of the bundles of wires 27 and the force required to bend them. An electrical device 29 is shown to demonstrate how the elastomer strap 9 can accommodate an obstruction and hold the wiring tool 1 and 15 in place in the wire ducts 21 and 23. The flat bars 3 are joined to form a 90° angle to fit within two sections of wire ducts joined at 90°. It is understood that the flat bars 3 could be joined to form any angle corresponding to the angle formed by the wire ducts 21 and 23.

FIG. 4 shows that the elastomer strap 9 fits between the teeth 25 and that the risers 5 and 17 extend beyond the teeth 25 of the wire ducts 21 and 23.

While the preferred embodiments described herein set forth the best mode to practice this invention presently contemplated by the inventors, numerous modifications and adaptations of this invention will be apparent to others of ordinary skill in the art. Therefore, the embodiments are to be considered as illustrative and exemplary and it is understood that the claims are intended to cover such modifications and adaptations as they are considered to be within the spirit and scope of this invention.

INDUSTRIAL APPLICABILITY

A wiring tool 1 and 15, when made in accordance with this invention advantageously provides a stiff corner at the juncture of the wire ducts 21 and 23 and a riser 5 or 17 that facilitates bending a wire bundle or harness 90° to fit within the wire ducts 21 and 23 without damaging or removing the teeth 25 adjacent the juncture. The wiring tool 1 and 15 improve the quality and appearance of the wire bundle or harnesses 27 in the wire ducts 21 and 23 and keep wire bundle or harness 27 off the teeth 25 adjacent the juncture of the wire ducts 21 and 23.

What is claimed is:

1. A wiring tool for wire ducts disposed at an angle to one another forming a juncture and having a plurality of teeth on opposite sides, which form the sides of the ducts and allow wires to be brought into and out of the ducts on either side and to be held between the teeth as they enter and exit the ducts, the wiring tool comprising a pair of flat bars joined together at one end to form an angle between the bars generally equal to the angle at which the wire ducts are disposed, a riser extending upwardly from the juncture of the bars and means for holding the wiring tool in place in the wire ducts with the riser adjacent the juncture of the ducts to facilitate placing a bundle of wires in the ducts and prevent the teeth adjacent the juncture of the ducts from being damaged, and for allowing the wiring tool to be removed easily from the ducts when the bundle of wires is in place in the ducts.

2. The wiring tool as set forth in claim 1, wherein the ducts and flat bars form a 90° angle.

3. The wiring tool as set forth in claim 1, wherein the means for holding the wiring tool in place in the wire ducts and allowing the wiring tool to be removed easily comprises an eastomeric strap fastened to distal ends of the flat bars with fasteners.

4. The wiring tool as set forth in claim 3, wherein the fasteners comprise a flat washer having an outer diameter generally equal to the width of the strap and a rivet that clamps the strap between the washer and the flat bar.

5. The wiring tool as set forth in claim 1, wherein the flat bars and riser are made of a plastic material.

6. The wiring tool as set forth in claim 5, wherein the plastic material is transparent.

7. The wiring tool as set forth in claim 5, wherein the flat bars and riser are made integral.

8. The wiring tool as set forth in claim 1, wherein the riser is generally L shaped and the distal end is rounded off.

9. The wiring tool as set forth in claim 1, wherein the riser is in the shape of a round bar and the distal end is rounded off.

10. The wiring tool as set forth in claim 1, wherein the riser extends beyond the teeth of the wire ducts.

* * * * *